(12) United States Patent
Fukushima

(10) Patent No.: US 11,117,472 B2
(45) Date of Patent: Sep. 14, 2021

(54) PARKING ASSISTANCE SYSTEM AND PARKING ASSISTANCE DEVICE

(71) Applicant: NISSAN MOTOR CO., LTD., Yokohama (JP)

(72) Inventor: Yoshitake Fukushima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 22 days.

(21) Appl. No.: 15/564,061

(22) PCT Filed: Apr. 7, 2015

(86) PCT No.: PCT/JP2015/060804
§ 371 (c)(1),
(2) Date: Oct. 3, 2017

(87) PCT Pub. No.: WO2016/162937
PCT Pub. Date: Oct. 13, 2016

(65) Prior Publication Data
US 2018/0093579 A1    Apr. 5, 2018

(51) Int. Cl.
*B60R 21/00*    (2006.01)
*B62D 15/02*    (2006.01)
(Continued)

(52) U.S. Cl.
CPC .......... *B60L 11/1835* (2013.01); *B60L 53/36* (2019.02); *B60L 53/37* (2019.02); *B60R 21/00* (2013.01);
(Continued)

(58) Field of Classification Search
CPC .............. B60L 11/1835; B60L 11/1833; B60L 11/1831; G08G 1/168; G06T 3/4038;
(Continued)

(56) References Cited

U.S. PATENT DOCUMENTS 7,043,346 B2   5/2006  Kubota et al.
8,170,752 B2   5/2012  Shimazaki et al.
(Continued)

FOREIGN PATENT DOCUMENTS

EP    2 184 208 A1   5/2010
JP    4235026 B2     3/2009
(Continued)

*Primary Examiner* — Joseph G Ustaris
*Assistant Examiner* — Jill D Sechser
(74) *Attorney, Agent, or Firm* — Foley & Lardner LLP

(57) ABSTRACT

In a parking assistance system comprising: a power transmission device provided on a ground side and configured to transmit power; and a power receiving device provided in a vehicle and configured to receive the power transmitted by the power transmission device and supply the power to an electric load, the power transmission device includes: a power transmission coil configured to transmit the power; imaging means for imaging the power transmission coil; and sending means for sending the power receiving device an image captured by the imaging means, and the power receiving device includes: a power receiving coil configured to receive the power transmitted by the power transmission coil; receiving means for receiving the image; and display control means for displaying the image received by the receiving means on display means.

8 Claims, 12 Drawing Sheets

(51) Int. Cl.
*G08G 1/16* (2006.01)
*B60L 53/36* (2019.01)
*B60L 53/37* (2019.01)
*G06K 9/00* (2006.01)
*B60L 53/39* (2019.01)
*B60L 11/18* (2006.01)

(52) U.S. Cl.
CPC ....... *B62D 15/027* (2013.01); *B62D 15/0285* (2013.01); *G06K 9/00791* (2013.01); *G08G 1/168* (2013.01); *B60L 53/39* (2019.02); *B62D 15/028* (2013.01)

(58) Field of Classification Search
CPC .............. B62D 15/027; B62D 15/0285; B62D 15/028; G06K 9/00791; B60R 21/00
See application file for complete search history.

(56) References Cited

U.S. PATENT DOCUMENTS

| | | | |
|---|---|---|---|
| 9,616,927 B2 * | 4/2017 | Tsukamoto | B62D 15/028 |
| 9,956,914 B2 * | 5/2018 | Fukushima | B60L 11/1803 |
| 9,975,488 B2 * | 5/2018 | Fukushima | B60L 3/00 |
| 2005/0049766 A1 * | 3/2005 | Tanaka | B62D 15/0285 |
| | | | 701/36 |
| 2005/0074143 A1 * | 4/2005 | Kawai | B60D 1/36 |
| | | | 382/104 |
| 2008/0309763 A1 * | 12/2008 | Hongo | G06T 3/00 |
| | | | 348/148 |
| 2010/0066515 A1 * | 3/2010 | Shimazaki | B60W 50/14 |
| | | | 340/435 |
| 2010/0211267 A1 * | 8/2010 | Shimazaki | B60R 1/00 |
| | | | 701/42 |
| 2013/0002861 A1 * | 1/2013 | Mitsugi | G06K 9/00812 |
| | | | 348/135 |
| 2014/0092236 A1 | 4/2014 | Findeisen et al. | |
| 2014/0132208 A1 * | 5/2014 | Fisher | H02J 5/005 |
| | | | 320/108 |
| 2015/0057932 A1 * | 2/2015 | Nakagawa | B62D 15/029 |
| | | | 701/533 |
| 2015/0061576 A1 * | 3/2015 | Chen | B60L 11/1833 |
| | | | 320/108 |
| 2015/0061897 A1 | 3/2015 | Kees et al. | |
| 2015/0286880 A1 * | 10/2015 | Itou | B60L 11/1829 |
| | | | 348/148 |
| 2016/0243955 A1 * | 8/2016 | Yoshida | B62D 15/028 |
| 2016/0332572 A1 * | 11/2016 | Gibeau | B60L 11/1833 |
| | | | 320/108 |
| 2016/0332575 A1 * | 11/2016 | Fukushima | B60L 11/1803 |
| 2016/0350974 A1 * | 12/2016 | Hashimoto | G06T 19/006 |
| 2017/0001563 A1 * | 1/2017 | Fukushima | B60L 3/00 |

FOREIGN PATENT DOCUMENTS

| | | |
|---|---|---|
| JP | 2012-210008 A | 10/2012 |
| TW | WO 2014/076888 A1 | 5/2014 |
| WO | WO-2009/016925 A1 | 2/2009 |
| WO | WO-2013/146139 A1 | 10/2013 |

* cited by examiner (a)

(b)

(a)

(b)

(a)

(b)

(a)

(b)

PARKING ASSISTANCE SYSTEM AND PARKING ASSISTANCE DEVICE

TECHNICAL FIELD

The present invention relates to a parking assistance system and a parking assistance device which assist alignment of a power receiving coil on a vehicle side with a power transmission coil on a ground side.

BACKGROUND ART

As a parking assistance, there is conventionally known an invention of setting target parking lines on a display monitor to guide a vehicle to a parking target position (Patent Literature 1).

CITATION LIST

Patent Literature

Patent Literature 1: Japanese Patent No. 4235026

SUMMARY OF INVENTION

Technical Problem

However, in Patent Literature 1, the ground which actually does not move moves on the display monitor while the vehicle which is actually moving is stationary on the display monitor, and the driver may have a sense of strangeness.

The present invention has been made in view of the problem described above and an object thereof is to provide a parking assistance system and a parking assistance device which allow a driver to intuitively align a power reception coil on a vehicle side with a power transmission coil on a ground side.

A parking assistance system in one aspect of the present invention includes: a power transmission device having a power transmission coil provided on a ground side; and a power receiving device having a power receiving coil provided in a vehicle. The power receiving device receives an image captured by imaging means installed in the power transmission device and displays the received image on display means.

DESCRIPTION OF EMBODIMENTS

Figure 1:
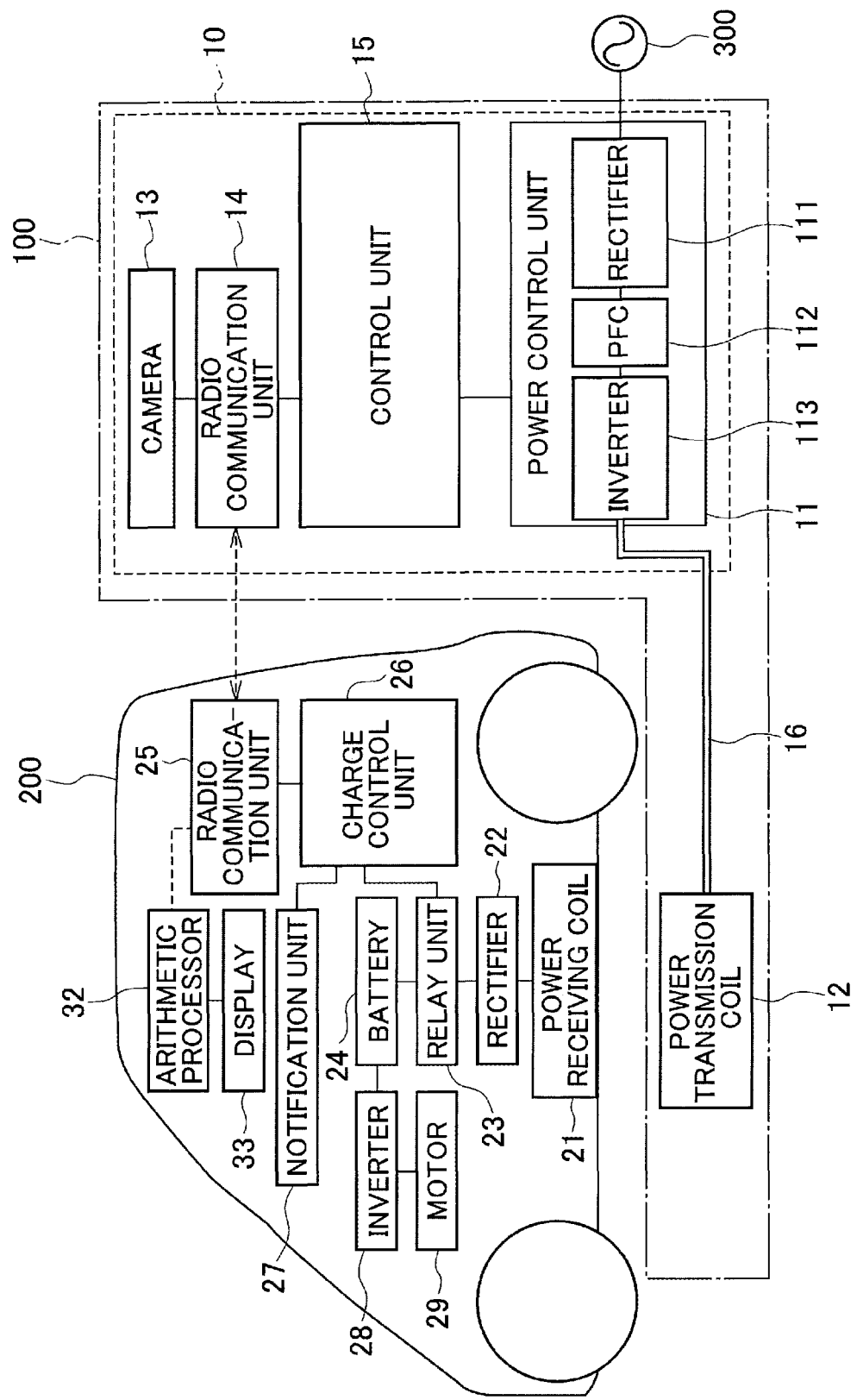
FIG. 1 is a diagram of an overall configuration of a parking assistance system in a first embodiment of the present invention.

Embodiments of the present invention are described below with reference to the drawings. In the description of the drawings, the same parts are denoted by the same reference numerals and description thereof is omitted.

First Embodiment

A diagram of an overall configuration of a parking assistance system in this embodiment is described with reference to the drawings.

As illustrated in FIG. 1, the parking assistance system includes a power supply device 100 (power transmission device) disposed on a ground side such as a power supply station, a parking space, or the like and a vehicle 200 (power receiving device). Electric power is contactlessly supplied from a power transmission coil 12 provided in the power supply device 100 to a power receiving coil 21 on the vehicle 200 side. More specifically, when voltage is applied to the power transmission coil 12, magnetic coupling is established between the power transmission coil 12 and the power receiving coil 21 and the power is supplied from the power transmission coil 12 to the power receiving coil 21. The power receiving coil 21 is disposed at such a position that the power receiving coil 21 faces the power transmission coil 12 when the vehicle 200 is parked at a predetermined position in the parking space.

The power supply device 100 includes the power transmission coil 12, a power transmission cable 16, and a ground controller 10.

The power transmission cable 16 is a cable which supplies power to the power transmission coil 12 and is provided on a surface of the parking space including the power transmission coil 12.

The ground controller 10 is a device installed on the ground close to the parking space and includes a camera 13, a radio communication unit 14, a control unit 15, and a power control unit 11.

The camera 13 (imaging unit) is incorporated in the ground controller 10 and images an area around the ground controller 10 in a time continuous manner. The camera 13 sends the radio communication unit 14 a captured video (or images).

The radio communication unit 14 performs bidirectional communication with a radio communication unit 25 provided in the vehicle 200.

The control unit 15 is a part which controls the entire power supply device 100. The control unit 15 sends the vehicle 200 a signal indicating start of power supply from the power supply device 100 and receives a signal requesting power reception from the power supply device 100 from the vehicle 200 by means of communication between the radio communication units 14, 25. Moreover, the control unit 15 sends the video captured by the camera 13 to the radio communication unit 25 via the radio communication unit 14. Furthermore, the control unit 15 performs switching control of an inverter 113 based on a current detected by a current sensor (not illustrated) to control the power to be supplied to the power transmission coil 12.

The power control unit 11 converts alternating current (AC) power transmitted from an AC power source 300 to high-frequency AC power to supply the converted power to the power transmission coil 12 and includes a rectifier 111, a PFC circuit 112, and the inverter 113.

The rectifier 111 is electrically connected to the AC power source 300 and rectifies the AC power outputted from the AC power source 300.

The PFC 112 is a circuit for correcting a power factor (power factor correction) by shaping a waveform outputted from the rectifier 111 and is connected between the rectifier 111 and the inverter 113.

The inverter 113 is a power conversion circuit including a PWM control circuit having a switching element such as an IGBT. The inverter 113 switches the switching element on and off based on the current detected by the current sensor (not illustrated). Then, the inverter 113 converts the AC power transmitted from the AC power source 300 to the high-frequency AC power and supplies the converted power to the power transmission coil 12.

The vehicle 200 includes the power receiving coil 21, a rectifier 22, a relay unit 23, a battery 24, the radio communication unit 25, a charge control unit 26, a notification unit 27, an inverter 28, a motor 29, an arithmetic processor 32, and a display 33.

The power receiving coil 21 is a vehicle coil provided on a bottom surface of the vehicle 200. When the vehicle 200 is parked at a predetermined parking position, the power receiving coil 21 and the power transmission coil 12 face each other while being spaced away by a predetermined distance. When the power for supply is supplied to the power transmission coil 12, the power is transferred to the power receiving coil 21 and the battery 24 can be thereby charged.

The rectifier 22 is connected to the power receiving coil 21 and rectifies the AC power received by the power receiving coil 21 to direct current (DC) power.

The relay unit 23 includes a relay switch which is switched on and off by control of the charge control unit 26. Moreover, the relay unit 23 disconnects a main circuit system including the battery 24 from the power receiving coil 21 and the rectifier 22 which form a charge circuit unit, by switching off the relay switch.

The battery 24 is a power source of the vehicle 200 and is formed by connecting multiple secondary cells.

The radio communication unit 25 performs bidirectional communication with the radio communication unit 14 provided in the power supply device 100.

The charge control unit 26 is a controller for controlling charging of the battery 24 and controls the relay unit 23, the radio communication unit 25, and the notification unit 27. Specifically, the charge control unit 26 sends the control unit 15 a signal indicating start of charging by means of communication between the radio communication units 25, 14. Moreover, the charge control unit 26 is connected to a controller (not illustrated) which controls the entire vehicle 200 via a CAN communication network. This controller manages switching control of the inverter 28 and the state of charge (SOC) of the battery 24. When the charge control unit 26 receives a signal indicating that the battery 24 is fully charged from the controller, the charge control unit 26 sends the control unit 15 a signal indicating termination of charging.

The notification unit 27 includes a warning lamp, a speaker, and the like and outputs light, sound, and the like to a driver based on control by the charge control unit 26.

The inverter 28 is a power conversion circuit including a PWM control circuit having a switching element such as an IGBT and converts the DC power outputted from the battery 24 to AC power based on a switching control signal to supply the converted power to the motor 29.

The motor 29 is a drive source for driving the vehicle 200 and is, for example, three-phase electric motor.

The arithmetic processor 32 (display control unit) can execute predetermined image processing on the video captured by the camera 13 and perform display control by which information to be displayed on the display 33 is switched.

The display 33 (display device) displays various pieces of information to the driver and is, for example, a display of a navigation system. The display 33 displays the video captured by the camera 13.

Note that the control unit 15, the charge control unit 26, and the arithmetic processor 32 are a computer including a CPU, a ROM, a RAM, a data bus connecting these units, and an input-output interface, and the CPU performs predetermined processing according to a program stored in the ROM.

Next, a method of aligning the power receiving coil 21 with the power transmission coil 12 in the first embodiment is described with reference to parts (a) and (b) of FIG. 2 to parts (a) and (b) of FIG. 5. Note that, in the first embodiment, the camera 13 and the power transmission coil 12 are assumed to be arranged on a straight line extending in a parking front-rear direction as illustrated in part (a) of FIG. 2. Moreover, the camera 13 is assumed to be arranged at such a position that the camera 13 can capture an image in which the center of the power transmission coil 12 lies on the center line of the image in the horizontal direction as illustrated in part (b) of FIG. 2.

Figure 2:
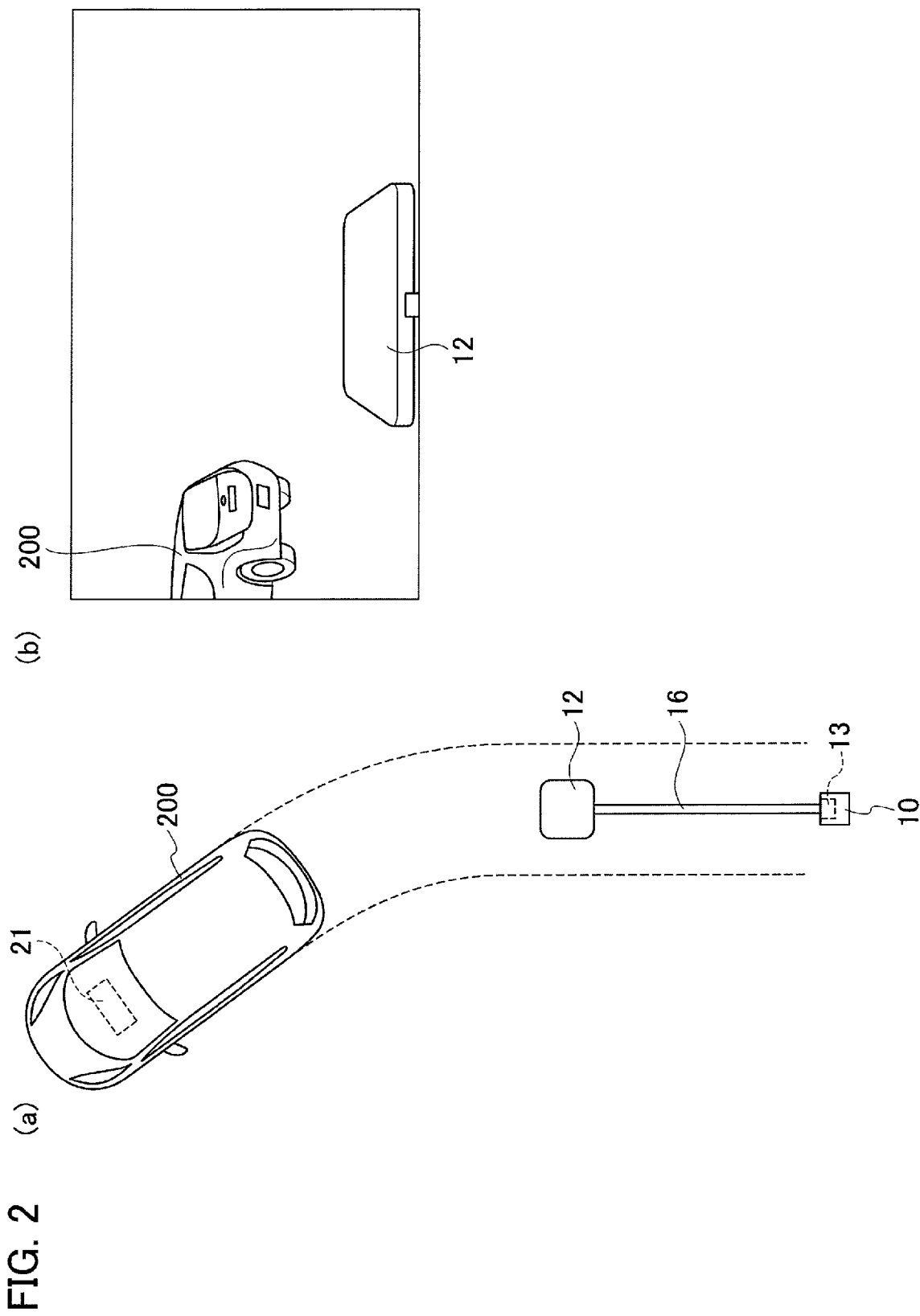
FIG. 2 Part (a) of FIG. 2 is a top view illustrating a positional relationship between a vehicle including a power receiving coil and a parking lot including a power transmission coil, and part (b) of FIG. 2 is a camera video capturing the positional relationship illustrated in part (a) of FIG. 2.

As illustrated in part (a) of FIG. 2, when the driver attempts to perform back-in parking of the vehicle 200 to align the power receiving coil 21 with the power transmission coil 12 (that is, to charge the battery 24), the vehicle 200 sends an activation signal to the ground controller 10. The activation signal is sent to the ground controller 10, for example, when the driver turns on a power supply switch (not illustrated) installed in the vehicle 200.

Figure 3:
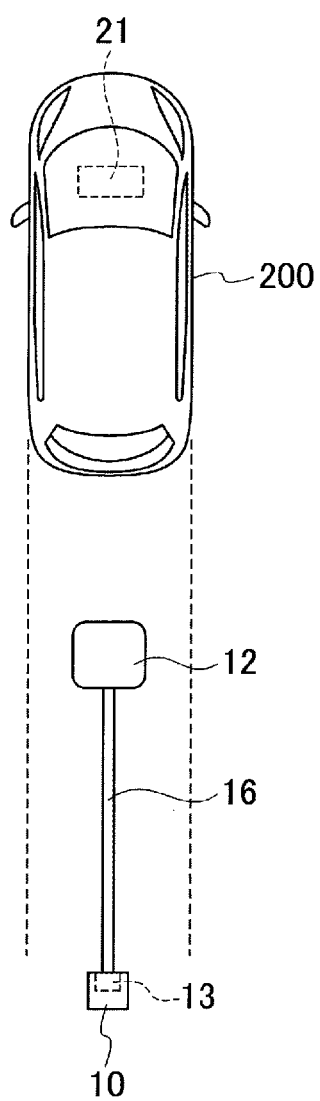
FIG. 3 Part (a) of FIG. 3 is a top view illustrating a positional relationship between the vehicle including the power receiving coil and the parking lot including the power transmission coil, and part (b) of FIG. 3 is a camera video capturing the positional relationship illustrated in part (a) of FIG. 3.
Figure 3:
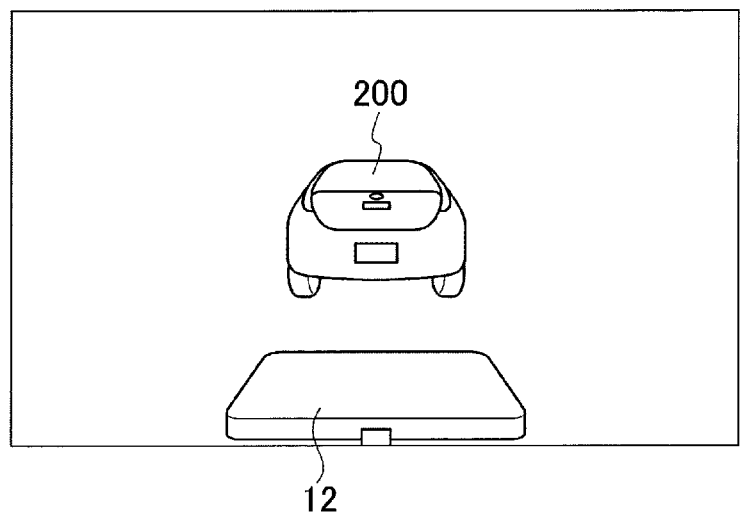

When the ground controller 10 receives the activation signal from the vehicle 200, the ground controller 10 activates the camera 13. Then, the ground controller 10 sends the vehicle 200 the video captured by the camera 13. The arithmetic processor 32 receives the video captured by the camera 13 and displays the video illustrated in part (b) of FIG. 2 on the display 33. In this case, the arithmetic processor 32 displays the video such that the center line of the video in the horizontal direction is aligned with the center line of the display 33 in the horizontal direction. Then, the driver parks the vehicle 200 as illustrated in part (b) of FIG. 3, part (b) of FIG. 4, and part (b) of FIG. 5 while viewing the video illustrated in part (b) of FIG. 2.

Figure 4:
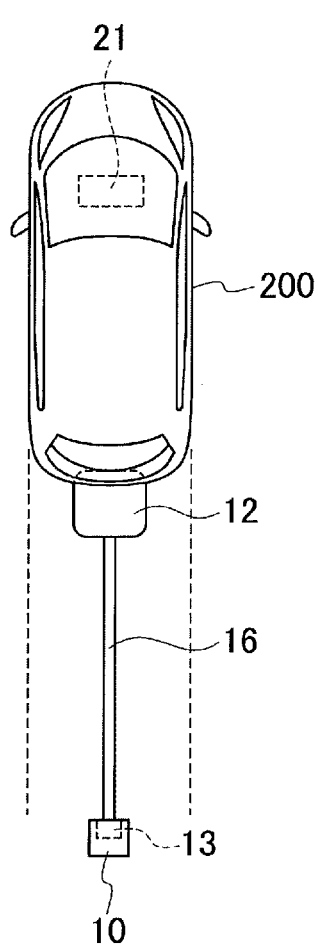
FIG. 4 Part (a) of FIG. 4 is a top view illustrating a positional relationship between the vehicle including the power receiving coil and the parking lot including the power transmission coil, and part (b) of FIG. 4 is a camera video capturing the positional relationship illustrated in part (a) of FIG. 4.
Figure 4:
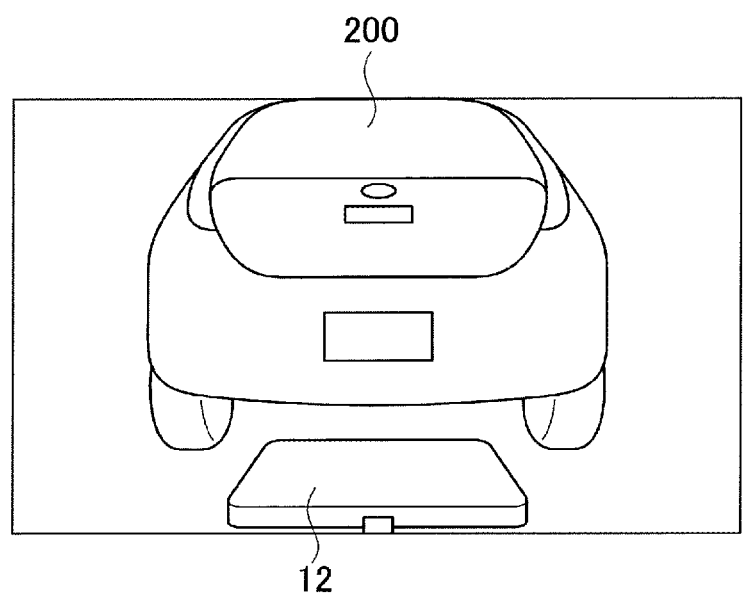

As illustrated in part (b) of FIG. 2 to part (b) of FIG. 4, since the driver can park the vehicle 200 while viewing the stationary power transmission coil 12 and the vehicle 200 approaching the power transmission coil 12 on the display 33, the driver can easily and intuitively align the power receiving coil 21 with the power transmission coil 12.

Figure 5:
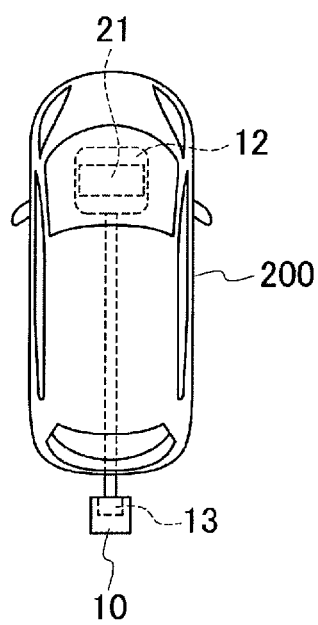
FIG. 5 Part (a) of FIG. 5 is a top view illustrating a positional relationship between the vehicle including the power receiving coil and the parking lot including the power transmission coil, and part (b) of FIG. 5 is a camera video capturing the positional relationship illustrated in part (a) of FIG. 5.
Figure 5:
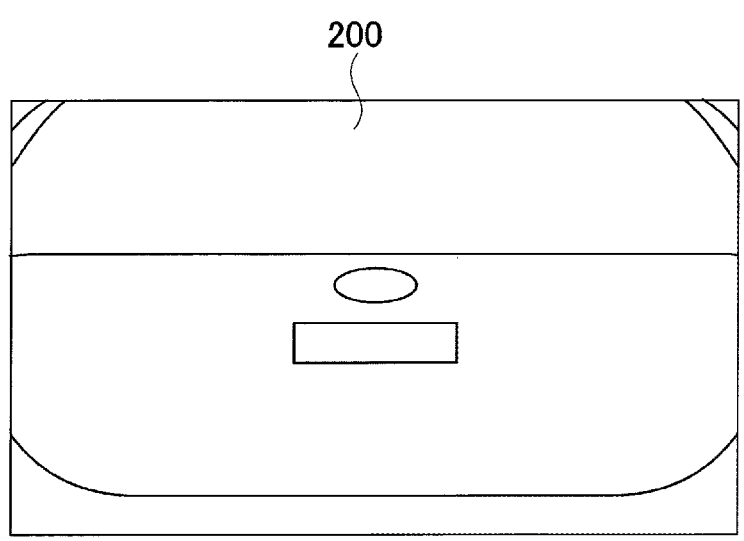

Note that, although the arithmetic processor 32 displays the video in which the center line of the video in the horizontal direction is aligned with the center line of the display 33 in the horizontal direction in the example illustrated in part (b) of FIG. 2 to part (b) of FIG. 5, the video may be processed and displayed. For example, as illustrated in part (a) of FIG. 6, the arithmetic processor 32 may superimpose, on the video, a center line L1 in a vehicle width direction which passes the center of the power transmission coil 12. The driver can thereby more accurately align the power receiving coil 21 with the power transmission coil 12 by parking the vehicle 200 in such a way that the center of the vehicle 200 is aligned with the center line L1.

Figure 6:
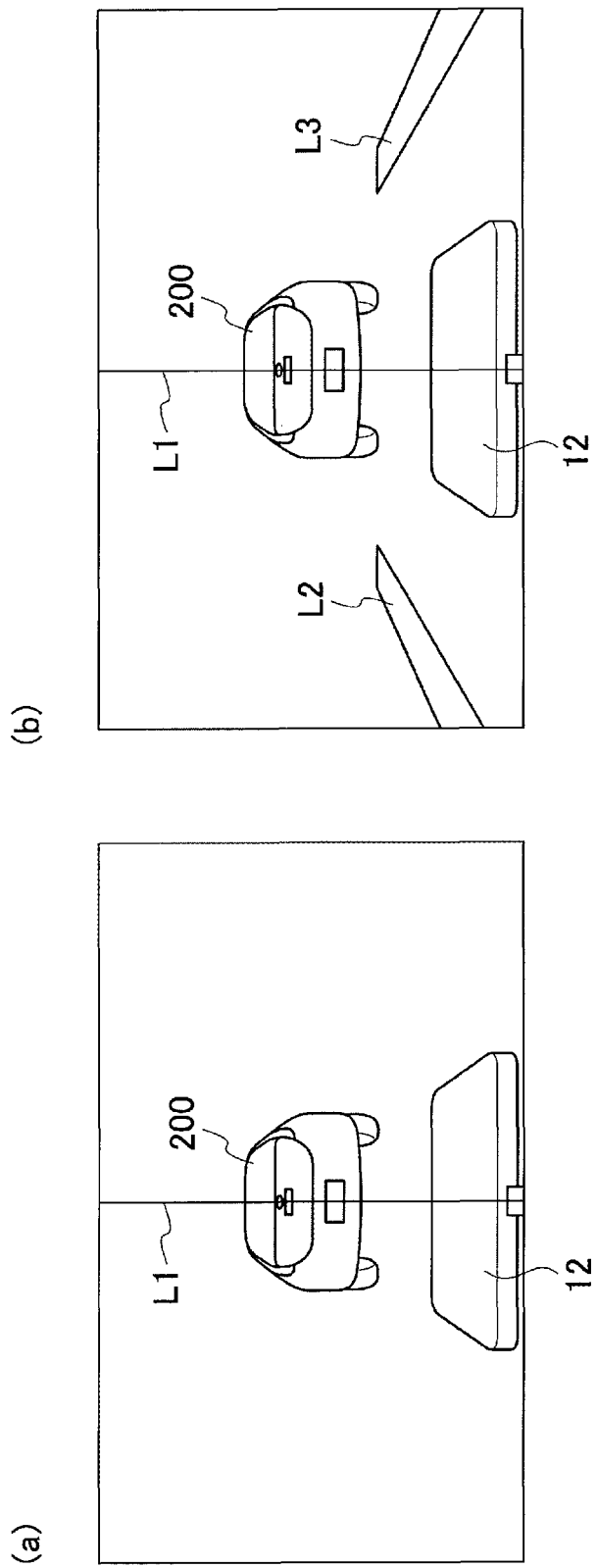
FIG. 6 Part (a) of FIG. 6 is a view in which a center line is superimposed on a camera video captured by a ground controller, and part (b) of FIG. 6 is a view in which the center line and parking lines are superimposed on the camera video captured by the ground controller.

Moreover, as illustrated in part (b) of FIG. 6, the arithmetic processor 32 may superimpose, on the video, parking lines L2, L3 (two parallel lines) along a vehicle entrance direction. Even when parking lines cannot be drawn in a parking lot due to housing conditions, displaying the parking lines L2, L3 on the video in a superimposed manner as described above allows the driver to park the vehicle 200 in the same feeling as in the case where the parking lines actually exist. Moreover, since displaying the parking lines L2, L3 in a superimposed manner as described above gives a sense of perspective to the video, the driver can easily and intuitively align the power receiving coil 21 with the power transmission coil 12.

Next, operation examples of the vehicle 200 and the ground controller 10 in the first embodiment are described with reference to a sequence diagram in FIG. 7.

In step S101, the vehicle 200 sends the ground controller 10 the activation signal.

In step S102, when receiving the activation signal from the vehicle 200, the ground controller 10 activates the camera 13 and starts the imaging.

In step S103, the ground controller 10 sends the vehicle 200 the video captured by the camera 13.

In step S104, the vehicle 200 superimposes the center line L1 on the received video.

In step S105, the vehicle 200 superimposes the parking lines L2, L3 on the received video.

In step S106, the vehicle 200 displays the video processed in step S104 and step S105 on the display 33.

In step S107, when the parking is completed, the vehicle 200 sends the ground controller 10 the termination signal indicating completion of parking. For example, the vehicle 200 can determine whether the parking is completed by determining whether a shift lever is at a P position. When the shift lever is at the P position, the vehicle 200 determines that the parking is completed and sends the ground controller 10 the termination signal. Alternatively, the vehicle 200 may send the ground controller 10 the termination signal when the ignition switch is turned off.

In step S108, when receiving the termination signal from the vehicle 200, the ground controller 10 stops the camera 13.

As described above, in the parking assistance system in the first embodiment, the following operations and effects can be obtained.

When the alignment of the power receiving coil 21 with the power transmission coil 12 (parking) is performed, the driver performs the alignment while viewing, on the display 33, the video captured by the camera 13 installed in the ground controller 10. Since the power transmission coil 12 is stationary on the display 33, the driver can perform the alignment while viewing the vehicle 200 approaching the stationary power transmission coil 12. The driver can thereby easily and intuitively align the power receiving coil 21 with the power transmission coil 12.

Moreover, the driver can view the video including the power transmission coil 12 from an initial stage of the parking. This allows the driver to grasp the condition of the power transmission coil 12 such as presence or absence of a foreign object on the power transmission coil 12, from the initial stage of the parking.

Moreover, the arithmetic processor 32 illustrated in FIG. 1 superimposes the center line L1 on the video captured by the camera 13. The driver can accurately align the power receiving coil 21 with the power transmission coil 12 by parking the vehicle 200 such that the center of the vehicle 200 is aligned with the center line L1.

Moreover, the arithmetic processor 32 superimposes the parking lines L2, L3 on the video captured by the camera 13. Even when the parking lines cannot be drawn in the parking lot due to housing conditions, displaying the parking lines L2, L3 on the video in a superimposed manner as described above allows the driver to park the vehicle 200 in the same feeling as in the case where the parking lines actually exist. Moreover, since displaying the parking lines L2, L3 in a superimposed manner as described above gives a sense of perspective to the video, the driver can easily and intuitively align the power receiving coil 21 with the power transmission coil 12.

Second Embodiment

Next, a second embodiment of the present invention is described with reference to FIGS. 8 to 11. The second embodiment is different from the first embodiment in that the arithmetic processor 32 creates a bird's-eye-view image P from the video captured by the camera 13 and displays the created bird's-eye-view image P on the display 33. The configurations overlapping those of the first embodiment are denoted by the same reference numerals and description thereof is omitted. Points different from the first embodiment are mainly described below. Note that, in the second embodiment, the positional information of the ground controller 10 and the power transmission coil 12 is assumed to be registered in the arithmetic processor 32 in advance.

Figure 8:
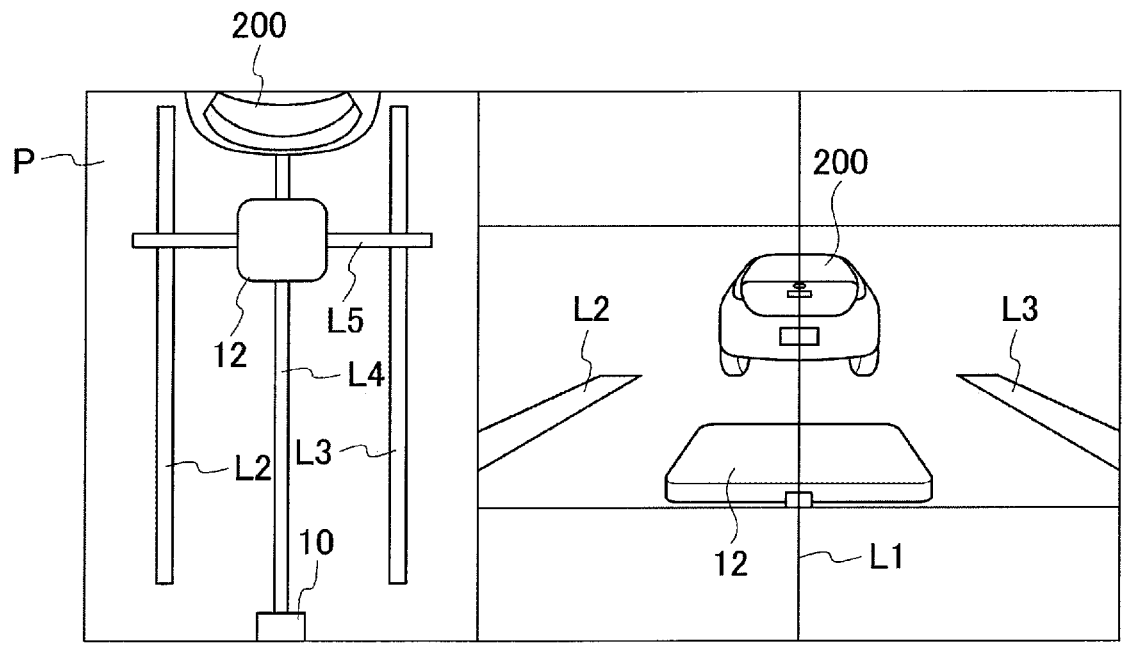
FIG. 8 Parts (a) and (b) of FIG. 8 are display examples of a display in a second embodiment of the present invention.
Figure 8:
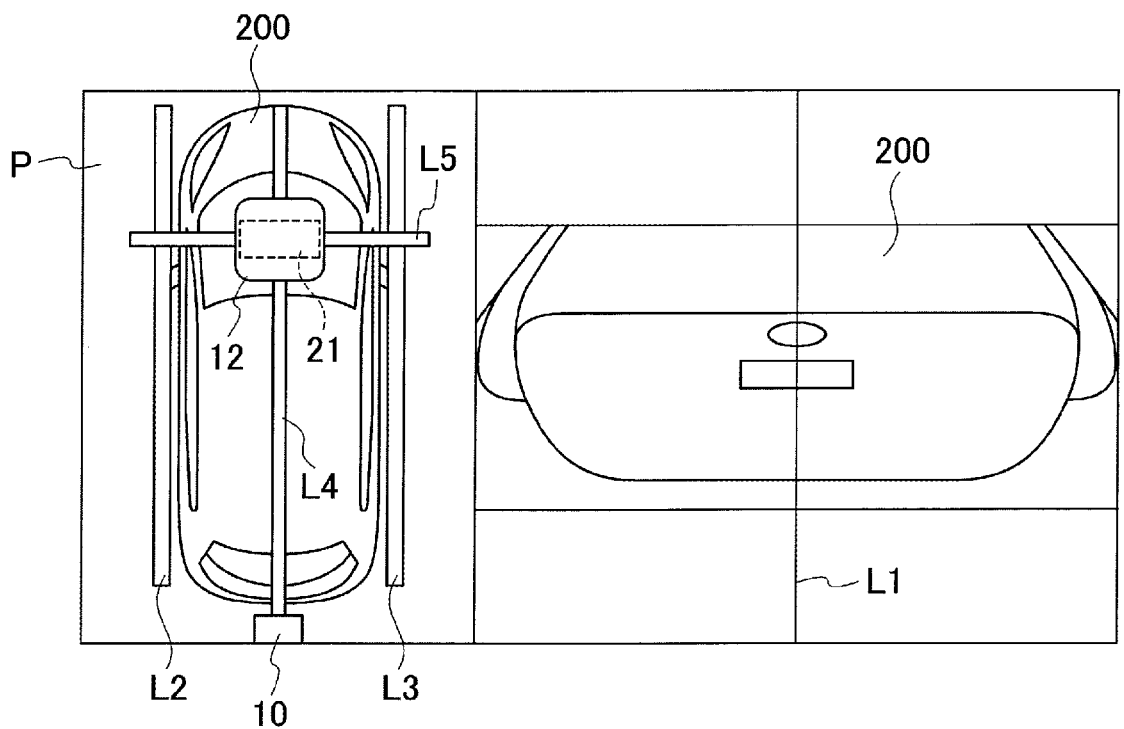
Figure 9:
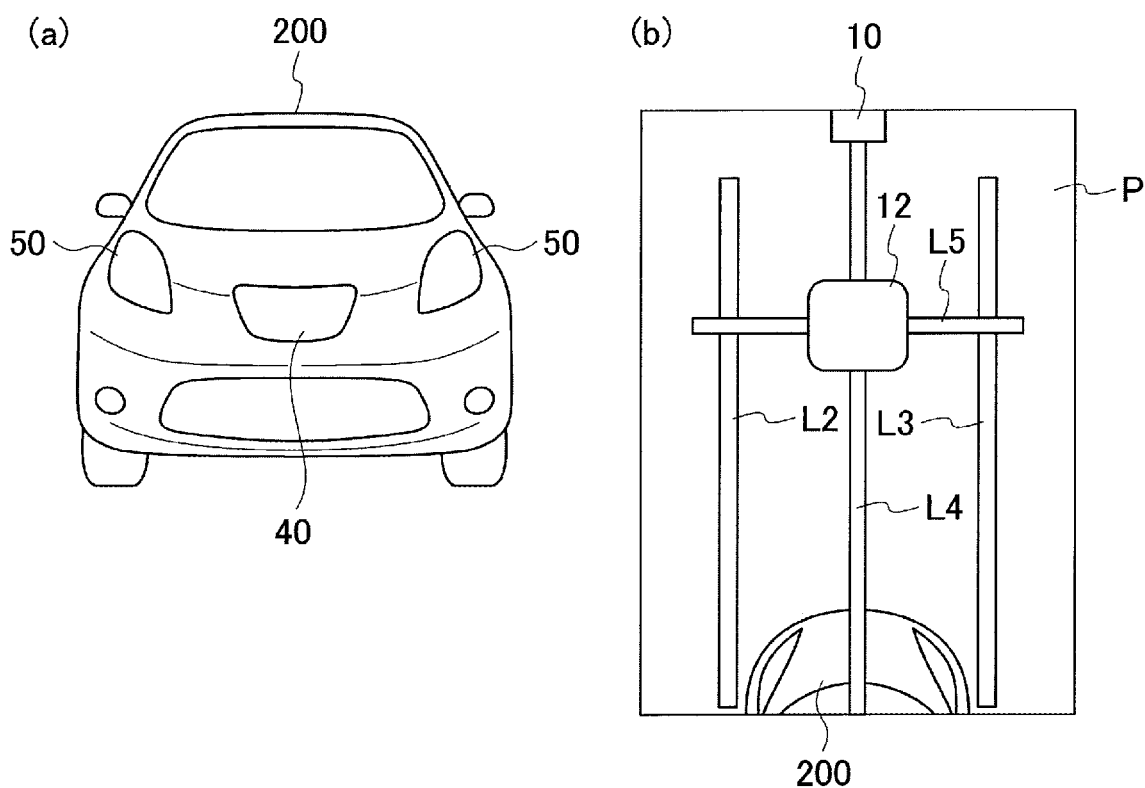
FIG. 9 Part (a) of FIG. 9 is a front view of the vehicle, and part (b) of FIG. 9 is a display example of the display in the second embodiment of the present invention.
Figure 10:
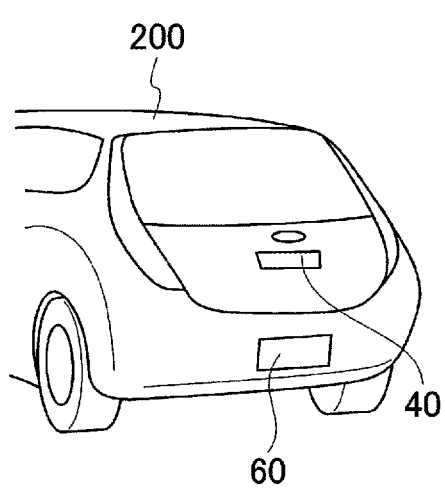
FIG. 10 Part (a) of FIG. 10 is a rear view of the vehicle, and part (b) of FIG. 10 is a display example of the display in the second embodiment of the present invention.
Figure 10:
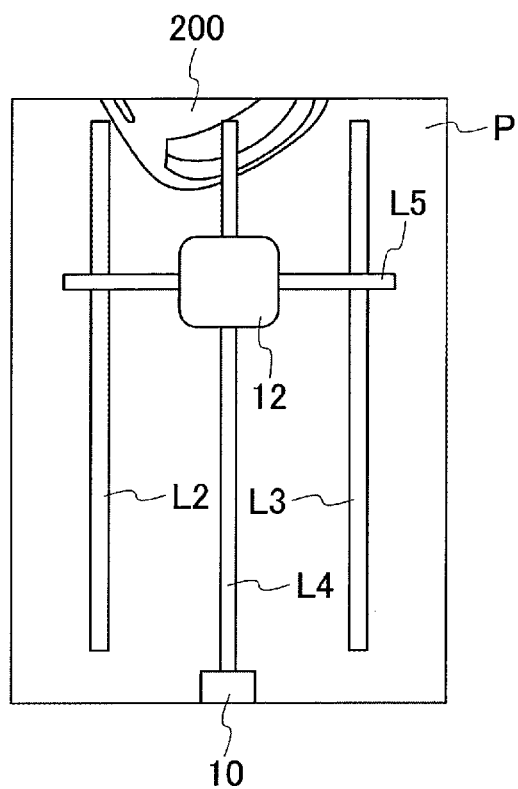

As illustrated in part (a) of FIG. 8, the arithmetic processor 32 displays both of the video captured by the camera 13 and the bird's-eye-view image P created by using this video, on the display 33. A method of creating the bird's-eye-view image P is described. The arithmetic processor 32 draws the ground controller 10 and the power transmission coil 12 by using the positional information of the ground controller 10 and the power transmission coil 12 registered in advance. Next, the arithmetic processor 32 draws a front-rear guide line L4 connecting the drawn ground controller 10 and the drawn power transmission coil 12 and a left-right guide line L5 intersecting the front-rear guide line L4 at a right angle at the center of the power transmission coil 12. Moreover, the arithmetic processor 32 draws the parking lines L2, L3 on left and right sides of the front-rear guide line L4 away therefrom by a predetermined distance (for example, 1 m).

Data in which a length per unit in the video captured by the camera 13 is converted to a length in the actual world is registered in the ground controller 10. This data can be obtained through experiments and simulations in advance. The ground controller 10 sends the arithmetic processor 32 this data together with the video captured by the camera 13.

The arithmetic processor 32 can draw the vehicle 200 in the bird's-eye-view image P by calculating the distance from the ground controller 10 to the vehicle 200 by using the received data. Moreover, the arithmetic processor 32 can draw the vehicle 200 and the power receiving coil 21 in the bird's-eye-view image P as illustrated in part (b) of FIG. 8 by using the dimensions of the vehicle 200 and the positional information indicating the installed position of the power receiving coil 21 which are registered in advance.

The driver aligns the power receiving coil 21 with the power transmission coil 12 while viewing the video captured by the camera 13 and the bird's-eye-view image P illustrated in parts (a) and (b) of FIG. 8.

Moreover, the arithmetic processor 32 can create the bird's-eye-view image P not only in back-in parking but also in front-in parking. As illustrated in part (a) of FIG. 9, the arithmetic processor 32 can determine which one of the back-in parking and the front-in parking is performed based on, for example, the position of an emblem 40 installed in the vehicle 200 and presence or absence of head lights 50. Then, when determining that the front-in parking is performed, the arithmetic processor 32 can create the bird's-eye-view image P illustrated in part (b) of FIG. 9.

Moreover, the arithmetic processor 32 can create the bird's-eye-view image P also when the vehicle 200 enters the parking space at a certain angle. For example, as illustrated in part (a) of FIG. 10, the arithmetic processor 32 can calculate the entrance angle of the vehicle 200 from rates of deformation of the emblem 40 and a license plate 60 from the case where the emblem 40 and the license plate 60 are viewed from the front side. Then, the arithmetic processor 32 can create the bird's-eye-view image P illustrated in part (b) of FIG. 10 by using the calculated entrance angle.

Figure 11:
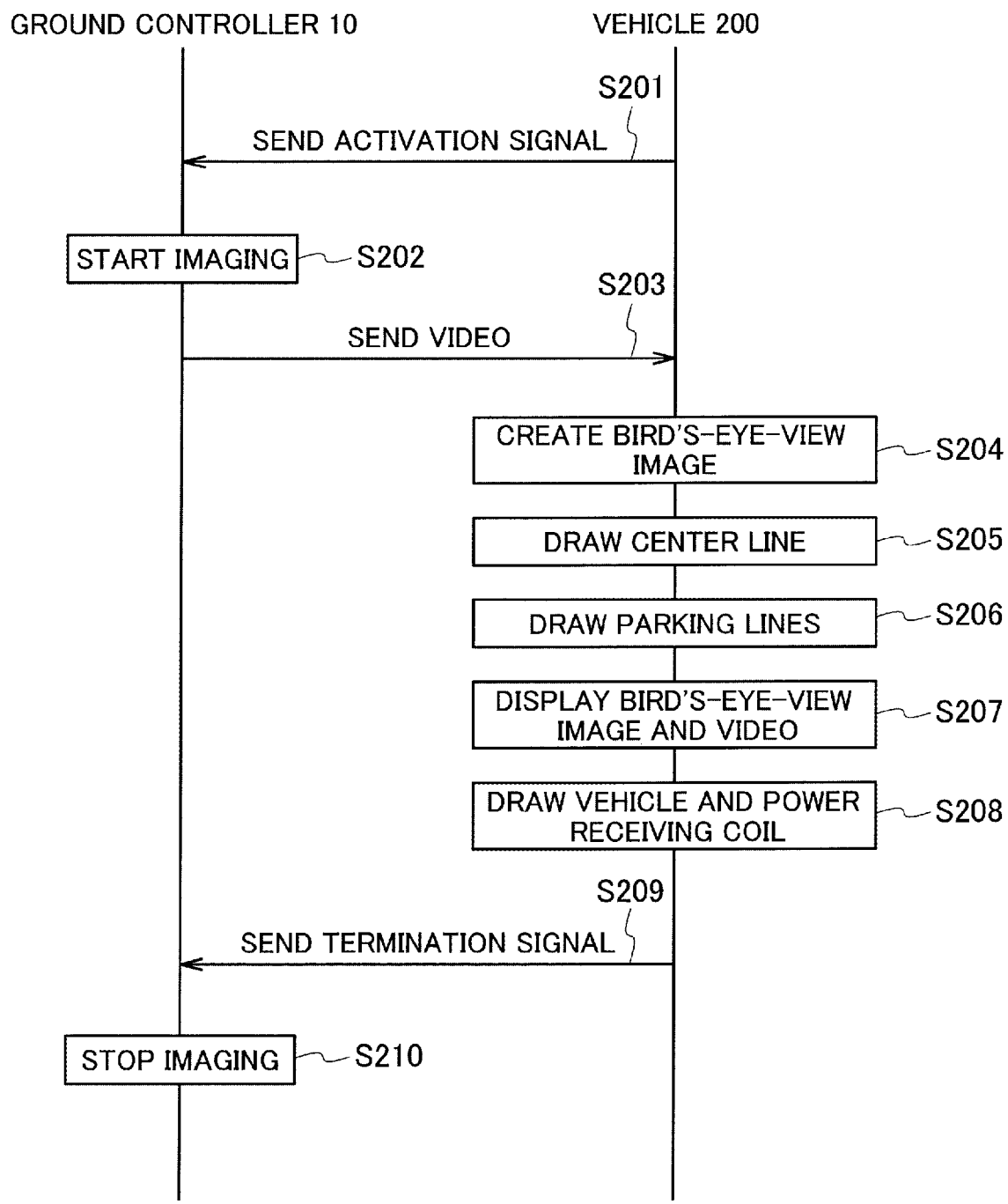
FIG. 11 is a sequence diagram depicting operation examples of the vehicle and the ground controller in the second embodiment of the present invention.

Next, operation examples of the vehicle 200 and the ground controller 10 in the second embodiment are described with reference to FIG. 11.

Figure 7:
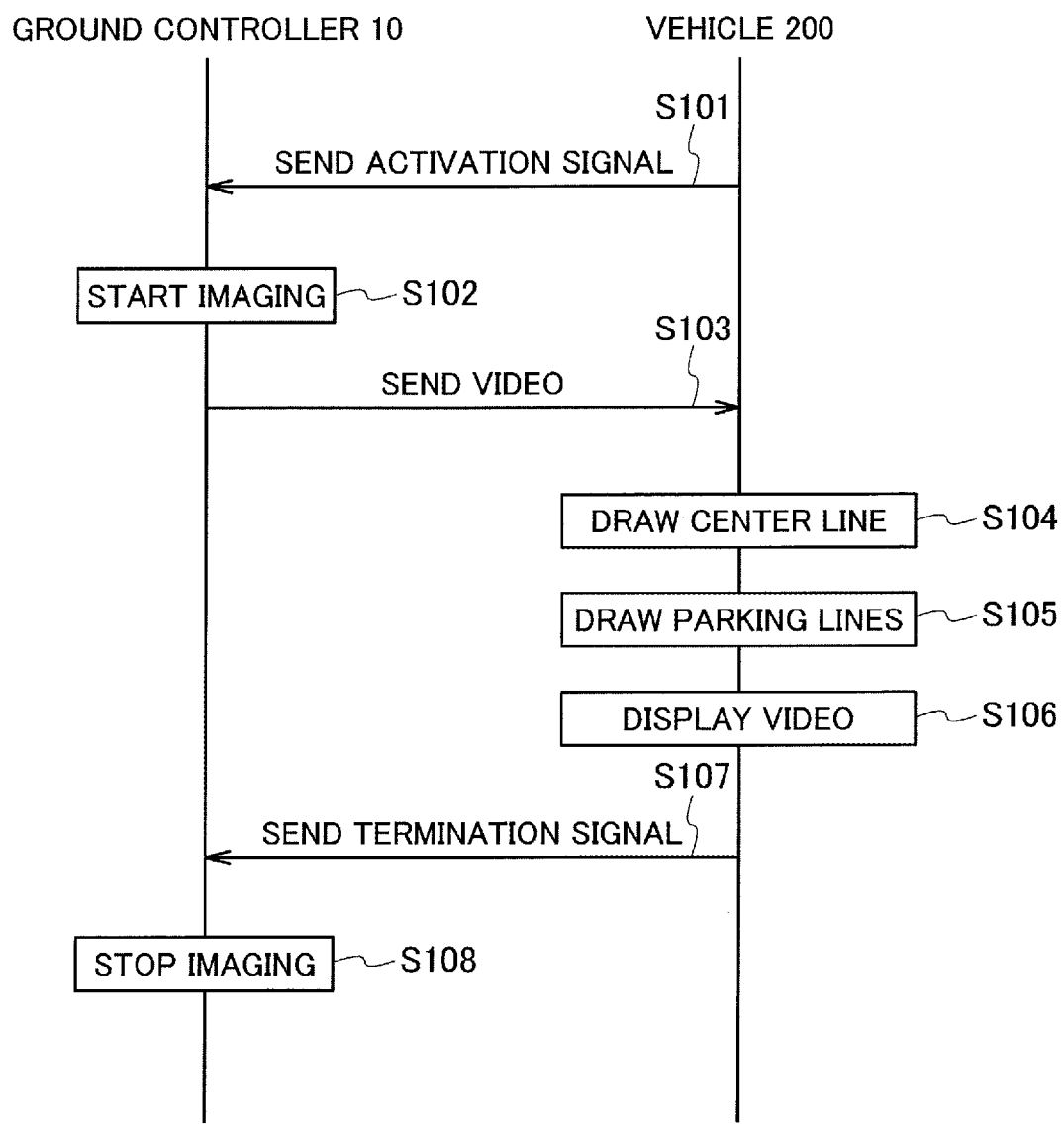
FIG. 7 is a sequence diagram depicting operation examples of the vehicle and the ground controller in the first embodiment of the present invention.

Since the operation examples in steps S201 to S203 are the same the operation examples in steps S101 to S103 illustrated in FIG. 7, description thereof is omitted.

In step S204, the vehicle 200 creates the bird's-eye-view image P by using the received video.

In step S205, the vehicle 200 superimposes the center line L1 on the received video.

In step S206, the vehicle 200 superimposes the parking lines L2, L3 on the received video.

In step S207, the vehicle 200 displays the bird's-eye-view image P created in step S204 and the video processed in step S205 and step S206 on the display 33.

In step S208, the vehicle 200 superimposes the vehicle 200 and the power receiving coil 21 on the bird's-eye-view image P.

Since the operation examples in steps S209 to S210 are the same as the operation examples in steps S107 to S108 illustrated in FIG. 7, description thereof is omitted.

As described above, in the parking assistance system in the second embodiment, the following operations and effects can be obtained.

When the alignment of the power receiving coil 21 with the power transmission coil 12 is performed, the driver performs the alignment while viewing, on the display 33, the video captured by the camera 13 and the bird's-eye-view image P created by using this video. Since the power transmission coil 12 is stationary on the display 33, the driver can perform the alignment while viewing the vehicle 200 approaching the stationary power transmission coil 12. Moreover, the power transmission coil 12 and the power receiving coil 21 are simultaneously displayed in the bird's-eye-view image P. The driver can thereby easily and intuitively align the power receiving coil 21 with the power transmission coil 12.

Moreover, the parking assistance system can determine which one of the back-in parking and the front-in parking is performed based on the position of the emblem 40 installed in the vehicle 200 and the presence or absence of the head lights 50. The parking assistance system can thereby create the bird's-eye-view image P in both cases of the back-in parking and the front-in parking.

Moreover, the parking assistance system can obtain the angle at which the vehicle 200 enters the parking space. The parking assistance system can thereby create the bird's-eye-view image P corresponding to the entrance angle.

Figure 12:
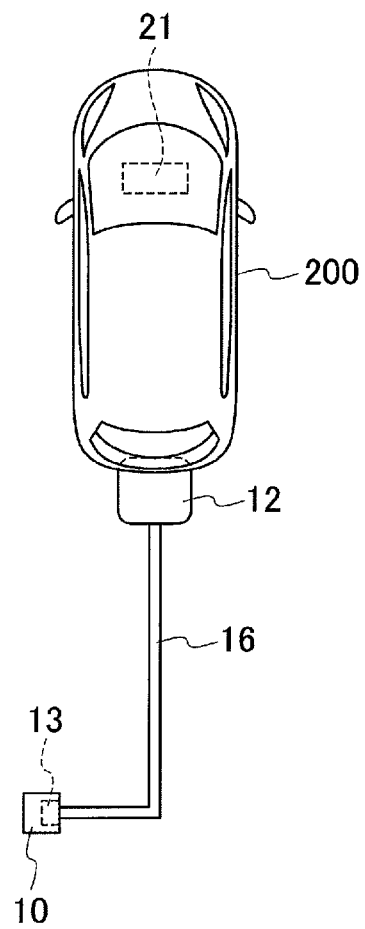
FIG. 12 is a top view illustrating a positional relationship between the vehicle including the power receiving coil and the parking lot including the power transmission coil.

Although the embodiments of the present invention have been described above, it should not be understood that the description and drawings forming part of this disclosure limit the present invention. From this disclosure, various alternative embodiments, examples, and operations techniques will be found by those skilled in the art. For example, as illustrated in FIG. 12, similar parking assistance can be performed even when the position where the ground controller 10 is installed is changed.

REFERENCE SIGNS LIST 10 ground controller
12 power transmission coil
13 camera
15 control unit
21 power receiving coil
25 radio communication unit
32 arithmetic processor
33 display
100 power supply device
200 vehicle

The invention claimed is:
1. A parking assistance system comprising:
a power transmission device provided on a ground side and configured to transmit power; and
a power receiving device provided in a vehicle and configured to receive the power transmitted by the power transmission device and supply the power to an electric load, wherein
the power transmission device includes:
a power transmission coil configured to transmit the power;
an imaging unit configured to image the power transmission coil; and
a sending unit configured to send the power receiving device an image including an image of the power transmission coil, captured by the imaging unit, and the power receiving device includes:
- a power receiving coil configured to receive the power transmitted by the power transmission coil;
- a receiving unit configured to receive the image; and
- a display control unit configured to display the image received by the receiving unit on a display device, wherein the imaging unit is arranged at such a position that the imaging unit is capable of capturing an image in which a center of the power transmission coil lies on a center line of the image in a horizontal direction, the display control unit is configured to display the center line of the image in the horizontal direction, a center line of the display device in the horizontal direction, and the center of the power transmission coil such that the center of the power transmission coil lies on the center line of the image and on the center line of the display device, and both the center line of the image and the center line of the display device are visible.

2. The parking assistance system according to claim 1, wherein
the display control unit superimposes the center line of the image in the horizontal direction on the image.

3. The parking assistance system according to claim 1, wherein the display control unit superimposes at least two parallel lines along a vehicle entrance direction on the image.

4. The parking assistance system according to claim 1, wherein the display control unit creates a bird's-eye-view image including at least the power transmission coil and displays the bird's-eye-view image on the display device.

5. The parking assistance system according to claim 4, wherein the display control unit determines which one of back-in parking and front-in parking is performed from the image and superimposes the power receiving coil on the bird's-eye-view image based on a determination result.

6. The parking assistance system according to claim 4, wherein the display control unit calculates, from the image, an angle at which the vehicle enters a parking space and superimposes an image indicating the vehicle on the bird's-eye-view image based on a calculation result.

7. A parking assistance device used to align a power receiving coil provided in a vehicle with a power transmission coil installed on a ground, comprising:
- a receiving unit configured to receive an image which is captured by an imaging unit installed in a ground controller and which includes an image of the power transmission coil at a center; and
- a display control unit configured to display the image received by the receiving unit on a display device, wherein
the display control unit displays the image with a center line of the image in a horizontal direction aligned with a center line of the display device in the horizontal direction, and the imaging unit is arranged at such a position that the imaging unit is capable of capturing an image in which a center of the power transmission coil lies on the center line of the image in the horizontal direction, the display control unit is configured to display the center line of the image in the horizontal direction, the center line of the display device in the horizontal direction, and the center of the power transmission coil such that the center of the power transmission coil lies on the center line of the image and on the center line of the display device, and both the center line of the image and the center line of the display device are visible.

8. A parking assistance device used to align a power receiving coil provided in a vehicle with a power transmission coil installed on a ground, comprising:
- a receiving unit configured to receive an image which is captured by an imaging unit installed in a ground controller and which includes an image of the power transmission coil at a center; and
- a display control unit configured to display the image received by the receiving unit on a display device, wherein
the display control unit displays the image with a center line of the image in a horizontal direction aligned with a center line of the display device in the horizontal direction, the imaging unit is arranged at such a position that the imaging unit is capable of capturing an image in which a center of the power transmission coil lies on the center line of the image in the horizontal direction, the display control unit is configured to display the center line of the image in the horizontal direction, the center line of the display device in the horizontal direction, and the center of the power transmission coil such that the center of the power transmission coil lies on the center line of the image and on the center line of the display device, and the center line of the image is visible and aligned with the center line of the display device.

* * * * *